United States Patent [19]

Koizumi et al.

[11] Patent Number: 5,287,204
[45] Date of Patent: Feb. 15, 1994

[54] IMAGE RECOGNITION APPARATUS FOR JUDGING BETWEEN MONOCHROMIC AND COLOR ORIGINALS

[75] Inventors: Hiroshi Koizumi; Katuyuki Kouno; Yoshiyuki Sorimachi; Yuzuru Suzuki; Yoshinori Awata, all of Kanagawa, Japan

[73] Assignee: Fuji Xerox Co., Ltd., Tokyo, Japan

[21] Appl. No.: 882,128

[22] Filed: May 13, 1992

[30] Foreign Application Priority Data

May 14, 1991 [JP] Japan .................................. 3-109184

[51] Int. Cl.⁵ .......................................... H04N 1/46
[52] U.S. Cl. ..................... 358/538; 358/530
[58] Field of Search ............ 358/75, 79, 80, 456, 358/457, 464, 465, 515, 518–520, 530, 538; 382/18, 19; H04N 1/46

[56] References Cited

U.S. PATENT DOCUMENTS

| 5,130,935 | 7/1992 | Takiguchi | 358/80 |
| 5,177,603 | 1/1993 | Kojima | 358/80 |
| 5,189,523 | 2/1993 | Sugiura et al. | 358/80 |

FOREIGN PATENT DOCUMENTS 2-144566  6/1990  Japan .
2-249365 10/1990  Japan .
3-44272   2/1991  Japan .

*Primary Examiner*—Stephen Brinich
*Attorney, Agent, or Firm*—Finnegan, Henderson, Farabow, Garrett & Dunner

[57] ABSTRACT

A color image recognition apparatus capable of judging whether an original is monochromatic or color comprises an image reader for rapidly scanning the original to develop image data and a color display coordinate system for converting the image data to luminance data and color difference data. A pixel color judging unit judges the color of each pixel based upon the luminance data and the color difference data, and a block color judging unit compares the number of color pixels with the number of black pixels contained in each of the plurality of blocks of pixels. An original color judging unit then counts the number of color blocks in the original to judge the color of the original.

16 Claims, 12 Drawing Sheets

NUMBER OF BLACK
PIXEL WITHIN BLOCK : BC
NUMBER OF COLOR
PIXEL WITHIN BLOCK : CC

COLOR BLOCK
CAUSED BY
COLOR SHIFTS

SMALL COLORED
PORTION

SAME JUDGEMENT RESULTS

MEDIUM BLOCK
BLOCK

COLOR BLOCKS
CAUSED BY
COLOR SHIFTS

⇩

MONOCHROMATIC
COLOR
JUDGEMENT

SMALL COLORED
PORTION

⇩

COLOR
JUDGEMENT

IMAGE RECOGNITION APPARATUS FOR JUDGING BETWEEN MONOCHROMIC AND COLOR ORIGINALS

BACKGROUND OF THE INVENTION

1. Field of the Invention

The present invention relates to a recording apparatus such as a copying machine, and more particularly to a color image recognition apparatus capable of judging whether an original is a monochromatic one or a color one based on image data which is obtained by reading the original.

2. Description of the Background Art

Generally, in color image recording apparatus, especially full color duplicating machines, since full color copies are expensive, such a mode selection is carried out that image data on an original are read out during a prescanning operation, a judgement is made whether the prescanned original is color or not based on the read image data, and a decision is made whether a color copying operation should be performed or not in response to the result of judgement.

To carry out the discrimination of color of the original, it has been proposed in Published Unexamined Japanese Patent Application No. 249365/1990 that, the original is divided into a plurality of blocks each including 3×3 pixels for instance so that each of the block is subjected to judgement whether the block is of chromatic or monochromatic(achromatic), and then it is judged according to a ratio of the number of monochromatic blocks to the total number of pixels whether the original is of chromatic or not. Also, there has been proposed in Published Unexamined Japanese Patent Application No. 144566/1990 that color discrimination is carried out for each pixel in white, achromatic color and chromatic color to thereby judge whether an original is of chromatic or monochromatic, and then color data concerning a color original is discriminated based on the result of judgement.

However, the above described conventional systems are disadvantageous in that the color image recognition processing is complicated resulting in making the hardware arrangement thereof complex and in prolonging the processing period of time. Further, there may occur difficulties that it is difficult to distinguish among colors having low chroma, and more specifically it is difficult to discriminate blackish colors such as dark brown. Furthermore, there may occur another difficulty to perform color discrimination with high accuracy in case of an area to be subjected to the color discrimination being relatively small.

SUMMARY OF THE INVENTION

In view of the above, the present invention is accomplished to eliminate the problems or difficulties accompanying the conventional systems, and an object of the invention is to provide a color image recognition apparatus capable of discriminating colors having low chroma and also discriminating colors whose areas are relatively small with short processing period of time and high accuracy, the apparatus being simple in hardware.

The above, and other objects of the present invention is attained by the provision of a color image recognition apparatus having an image reading means for reading an image data of an original to detect a color of said original, comprising color display coordinate system converting means for converting the image data to L, a, b image data including luminance data and color difference data, pixel color judging means for judging a pixel color of each pixel based upon the luminance data and the color difference data, block color judging means for comparing the number of color pixels contained in a block including a plurality of pixels, with the number of black pixels contained in the same block to judge the block color of each block, and original color judging means for counting the number of color blocks over the original to judge the color of the original.

With a color image recognition apparatus according to the present invention, R, G and B image data which are read out by an image reading means are converted into L, a and b image data composed of luminance signals and color difference signals by a color display coordinate system converting means, and then a judgement whether a detected pixel is of a color pixel or a monochromatic pixel is performed by checking whether the detected pixel is located within a tetragonal region of "a-b" plane. In this case, a degree of freedom with respect to the judgement may be expanded by substituting the tetragonal region by a polygon. Furthermore the color detection accuracy may be improved by changing the size of a region to be subjected to color discrimination in response to the luminance data L. more concretely, the accuracy is improved by enlarging the region in a dark case whereas it is also improved by making the region smaller in a bright case. As described above, a judgement is made whether the pixel is of color or monochromatic in unit of pixel. When the color of the block including the plural pixels is judged, the color judgement is performed based on both of the color pixel and the black pixel, except for the white pixel. Since the ratio of the color pixels occupied in the entire pixels becomes larger due to eliminating the white pixels, the color detection can be carried out with higher accuracy. Subsequently, another judgement is done whether the unit block is of color or black. This judgement is done based on a difference between the number of color pixels and that of black pixels within the block. Although the judgement of the block color is performed based on a decision of majority, if the number of black pixels is substantially equal to that of color pixels, the weight of the color block number is multiplied by that of the black block number within the neighbor blocks with reference to the judgement results of the neighbor blocks, and a decision of majority is again carried.

Next, when the block color has been judged, the number of color blocks is counted over the original plane, and the color of the original is judged by checking whether or not the count value exceeds a predetermined value. In this case, to shorten the time required to read the image data, it is considered that the prescanning speed is increased, or the color image data is detected during the back scanning operation. However, the correct data cannot be acquired due to the adverse influences of vibrations remaining in the reading device immediately after the ordinary scanning operation commences. Thus, the counting operation of the color blocks is suspended within a certain period of time corresponding to a predetermined line synchronization from the start of scanning operation, and then the original color judgement should be carried out based on the counting values after the certain period of time has elapsed.

Also, the contents of the counter for the color blocks are stored into the readable register, so that the proper threshold value used to judge the color of the original may be set in response to the original sizes or the like. Further, the color block histogram is formed by the judgement results of the block color, and in response to the difference between the number of color blocks at the maximum occurrence frequency and the number of color blocks at the second maximum occurrence frequency, in case of large difference, for instance, such a discrimination is made that the original is of color, as a result of which the color copy mode corresponding thereto is selected. Further, the chromatic color blocks are counted with the weighing process in accordance with the chroma of the color blocks, and then the color image is recognized not merely by either a full color or mono color, but by a mono color, two colors, three colors, or four colors. Moreover, the original color is judged in unit of medium block arranged by the plural blocks, when the color recognition is made in unit of at least one medium block, a judgement is made of the color image, and the detection precision for the small color portion can be improved. Also, the detection precision may be improved by judging the color of the original based on the difference between and the number of black blocks, and also the number of color blocks. The color of the original is judged by either changing the threshold value for checking whether or not the number of color blocks is larger than and equal to a predetermined value in accordance with the number of black blocks, or by counting the number of block colors within the region defined by the region signal for judging the color of the original, so that unnecessary judgments are carried out. Also, until the number of color blocks reaches a predetermined value, the number of color blocks with respect to the original plane is counted, and the counting operation is stopped when this number has reached a predetermined value.

DESCRIPTION OF THE PREFERRED EMBODIMENTS

Figure 1:
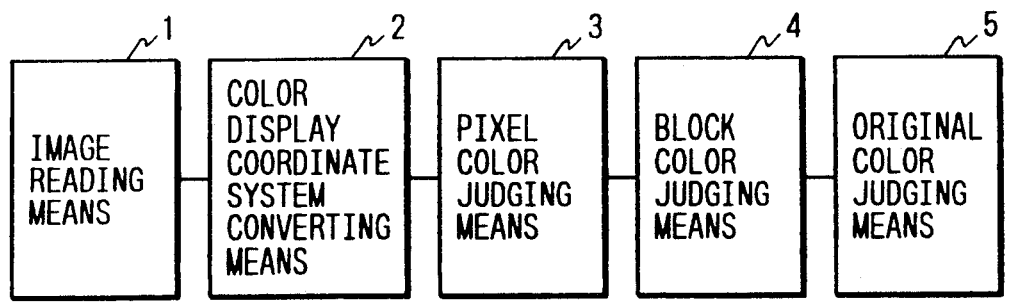
FIG. 1 is a block diagram showing function blocks of a color image recognition apparatus according to the present invention.
Figure 2:
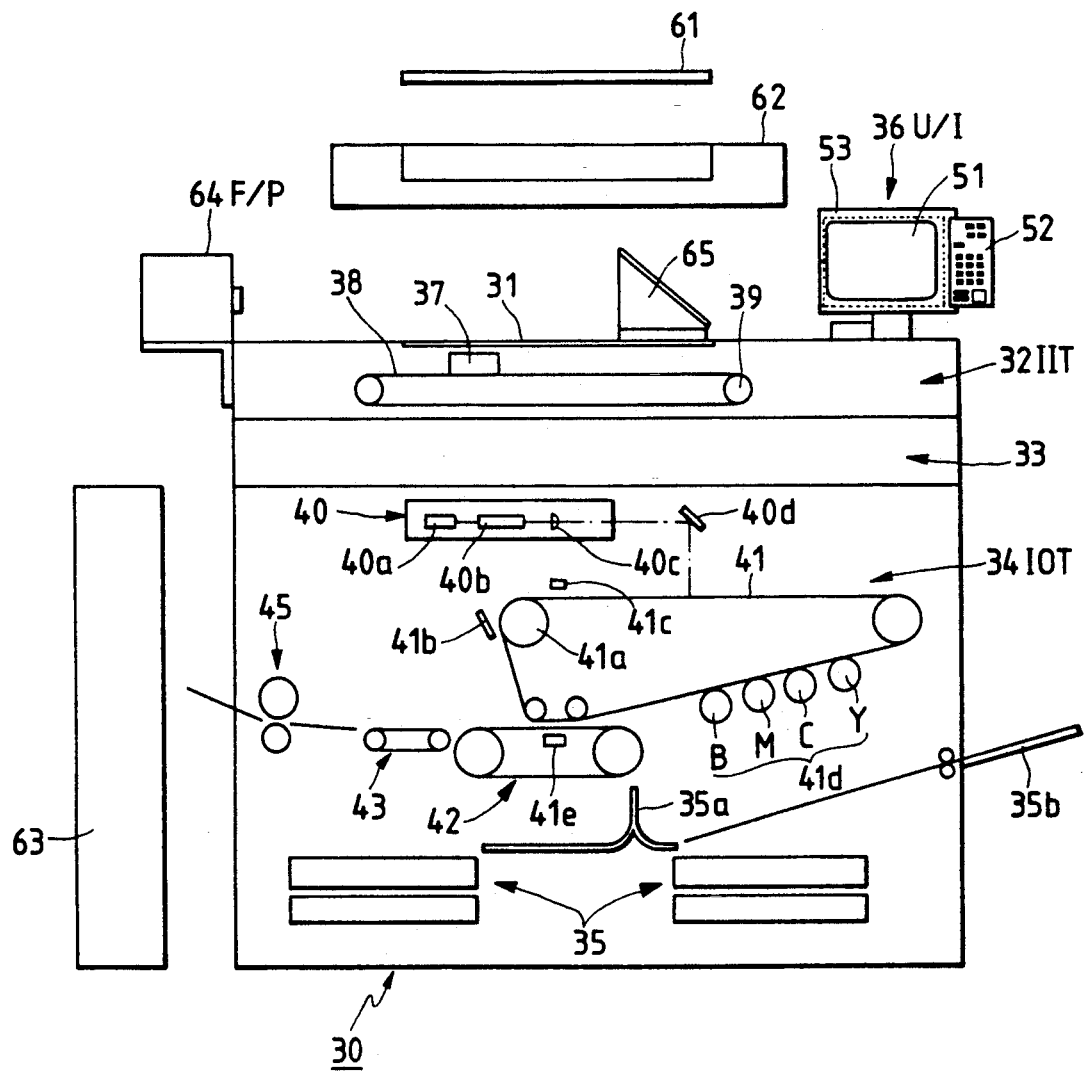
FIG. 2 is a schematic diagram showing a color copying machine to which the present invention is applied.
Figure 3:
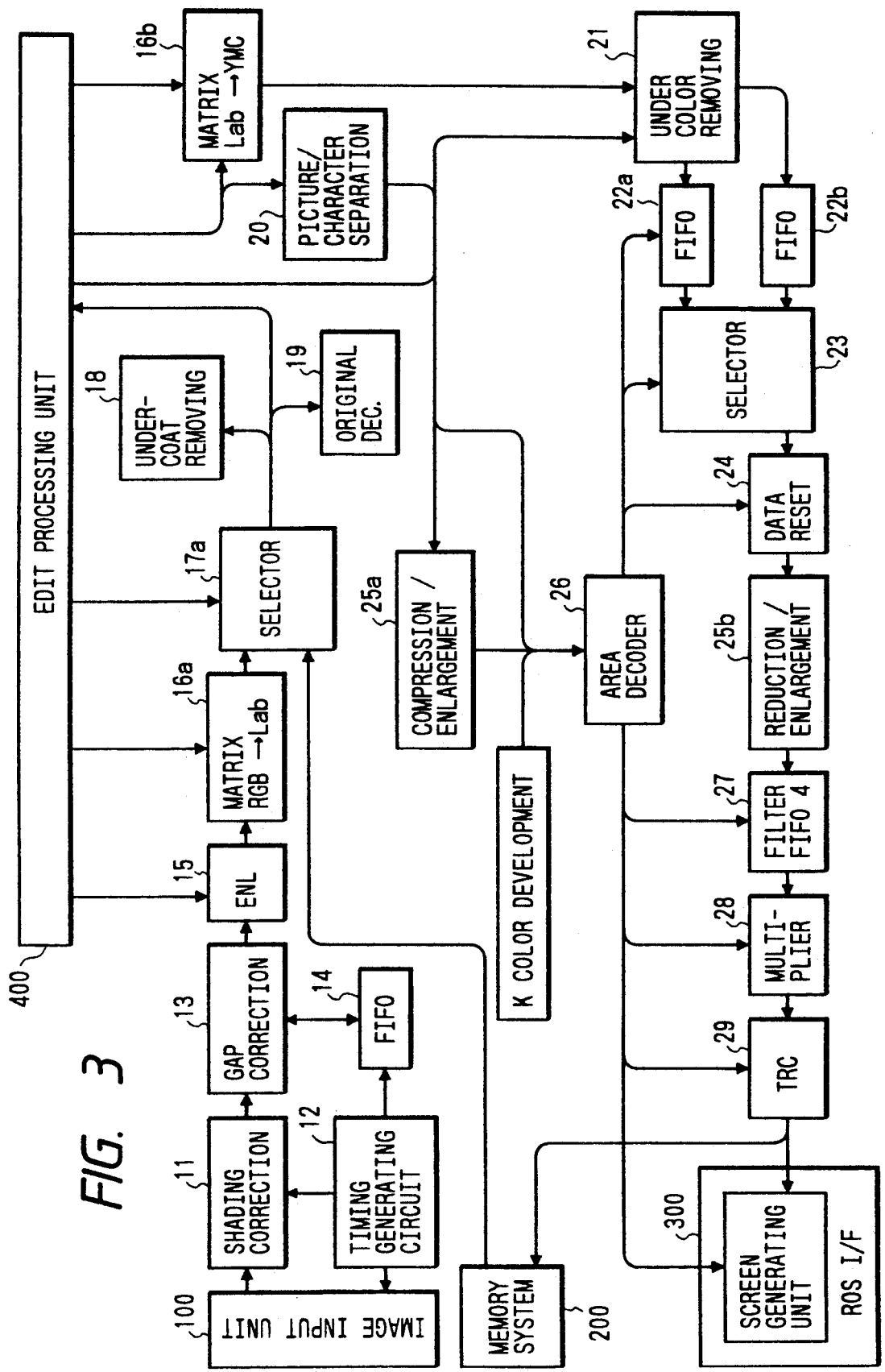
FIG. 3 is a block diagram showing an image processing circuit.
Figure 4:
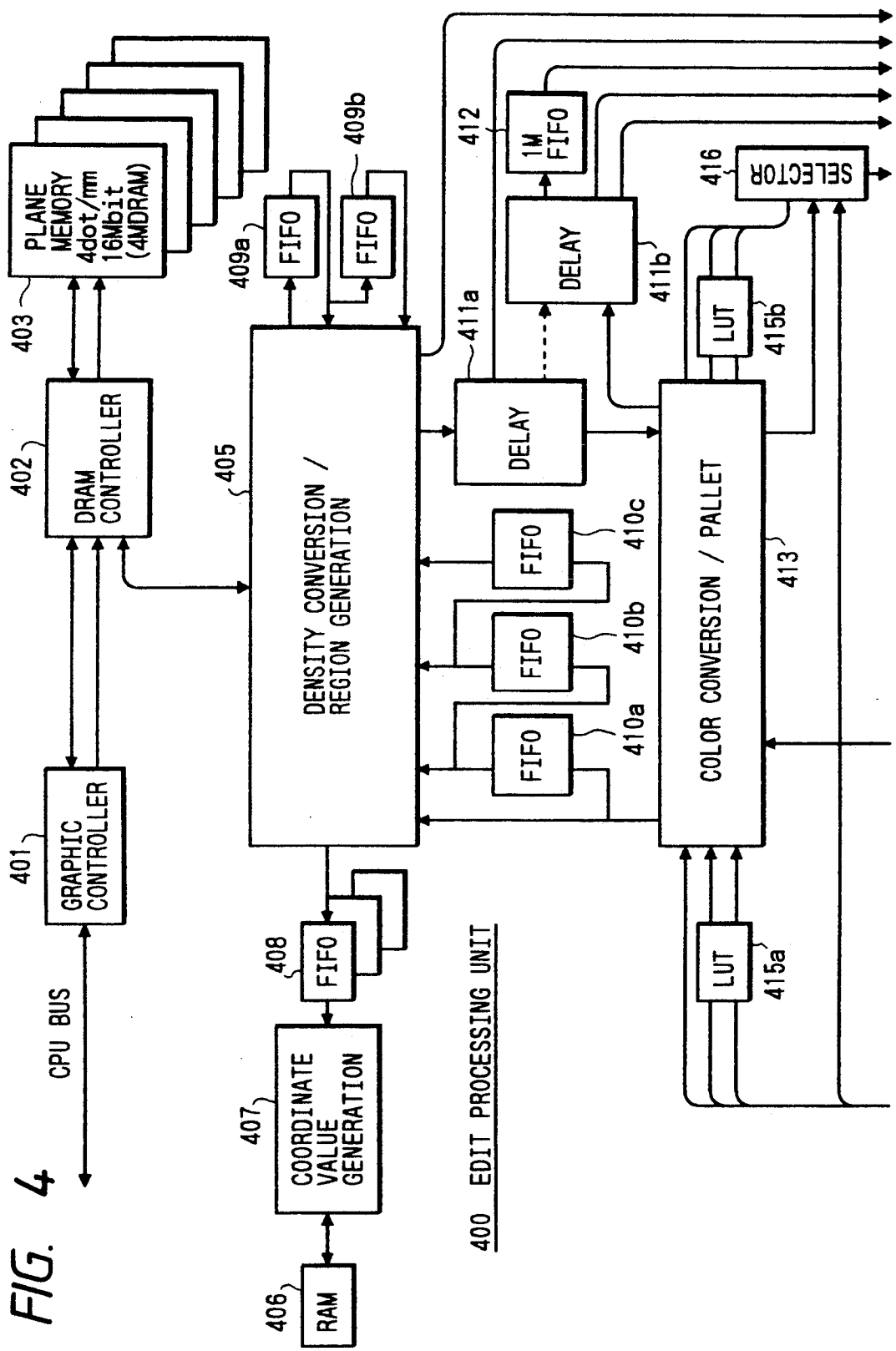
FIG. 4 is a block diagram of color edit processing.

FIG. 1 is a block diagram showing function blocks of a color image recognition apparatus according to the present invention, FIG. 2 is a schematic diagram showing a color copying machine to which the present invention is applied, FIG. 3 is a block diagram showing an image processing circuit, and FIG. 4 is a block diagram of color edit processing. The present invention will be described in summary with reference to FIGS. 2 to 4.

The color copying machine shown in FIG. 2 comprises a base machine 30 and a film image reading apparatus as an option. The base machine 30 includes a platen glass 31 on which an original is placed, an image input terminal (II) 32, a unit for accommodating an electric control system 33, an image out terminal (IOT) 34, a paper tray 35, and a user's interface (U/I) 36. The film image reading apparatus includes an edit pad 61, an automatic document feeder (ADF) 62, a sorter 63 and a film projector (F/P) 64 and a mirror unit (M/U) 65.

The image input terminal 32 includes an imaging unit 37, a wire 38 for driving the unit 37, a drive pulley 39 and the like. This image input terminal 32 converts into multi-gradation digital image signals B, G, R, image information of a color original which is color-separated by color filters provided in the imaging unit 37 into optical primary colors B (blue), G (green) and R (red), and then read out by a CCD line sensor. The image process system which is accommodated in the unit 33, performs various processes such that various conversions, correcting processes, and further editing processes are carried out so as to improve colors, gradation precision, other image qualities and reproducibility. Also, this image process system converts the image signals B, G, R into primary colors Y (yellow), M (magenta), C (cyan), and K (black) of a toner, and converts gradation toner signals of process colors into binary (ON/OFF) toner signals which are then applied to the image output terminal 34. The image output terminal 34 includes a scanner 40 and a sensitive material belt 41, in which the image signals are converted into optical signals in a laser output unit 40a so that a latent image corresponding to the original image is formed on the sensitive material belt 41 through a polygon lens 40b, F/θ lens 40c and a reflection mirror 40d. The latent image is transferred to a paper supplied from the paper tray 35 to thereby obtain and discharge a color copy therefrom.

In the image output terminal 34, the sensitive material belt 41 is driven by the drive pulley 41a, a cleaner 41b, a charger 41c, developers 41d of YMCK and a transfer unit 41e are arranged around the sensitive material belt 41. A transfer device 42 is positioned facing to the transfer unit 41e. Then, the paper supplied from the paper tray 35 via a paper transportation path 35a is caught by the image output terminal 34. In case of a four-color full color copy, the transfer device 42 rotates four times to transfer the respective latent images of YMCK onto the paper, and the paper is then transported from the transfer device 42 through a vacuum transporting device 43 to a fixing device 45 so as to fix the copied image thereon, whereby the fixed color copy is ejected. A SSI (single sheet inserter) 35b may selectively supply a single sheet of paper by a manual mode into the paper transportation pat 35a.

The user's interface 36 is provided so that the user selects a desired function to instruct executing conditions. The interface 36 includes a color display 51 and a hard control panel 52, and the user can directly make instructions by operating soft buttons displayed on the display 51 in combination with an infrared touch board 53.

The unit 33 accommodates a plurality of control boards which are constructed by separating various processing units into each unit such as the image input terminal 32, the image output terminal 34, the user interface 36, an image processing system and a film projector 64; an MCB board (machine control board) for controlling various mechanisms of the image output terminal 34, the automatic original feeding apparatus 62 and a sorter 63; and also an SYS board for controlling the entire system.

FIG. 3 is a schematic block diagram showing an overall arrangement of data processing system of the color copying machine according to the present invention.

An image input unit 100 includes a compression type sensor having three line sensors R,G,B arranged perpendicular to the subscanning direction, and the unit 100 operates to scan in synchronization with a timing signal derived from a timing generating circuit 12, thereby to read images. The thus read image data is subjected to shading-correction in a shading correction circuit 11 to be applied to the following gap correction circuit 13 where gap correction among the respective line sensors is effected. This gap correction is carried out in such a manner that the read image data is delayed by time corresponding to this gap in a FIFO 14, whereby the image signals R, G, B at the same position are obtained at the same time instant.

An ENL (equivalent Neutral Lightness) 15 is provided to perform a gray balance, and to reverse gray for each pixel so as to invert a negative/positive relationship in response to a negative/positive inverting signals from an edit processing unit 400 described later in detail, for instance, can invert the negative/positive relationship of a certain designed region. The gray-balanced image signals R, G, B are converted into the image signals "L", "a" and "b" in a matrix circuit 16a in response to a control signal from the edit processing unit 400. The conversion from R, G, B into L, a, b is to easily interface this unit with an external computer.

A selector 17 is provided to selectively derive either an output from the matrix circuit 16a, or image data from a memory system 200 functioning as an interface with the external computer under control of a signal from the edit processing unit 400. An under layer eliminating circuit 18 stores minimum density of an original during a prescanning operation and also maximum density thereof so as to improve an image quality of a copy for such a foggy original as a newspaper by skipping a pixel having density lower than the minimum density. An original detecting circuit 19 detects a boundary between a back side of a black platen and an original, and detects a size of the original irrelevant to a setting position of this original even when this original is positioned upright the scanning direction, and also stores the detected original size. The image signals which have been color-edited by the edit processing unit 400 are converted from L, a, b into toner colors of Y, M, C by the matrix circuit 16b, and black toner signals are formed by an under color removing circuit 21 to thereby generate Y, M, C and K. At the same time, a judgement is made whether the color-edited image signal is of a color character, a black character, or a picture pattern by a picture/character separating circuit 20. In the under color removing circuit 21, a hue signal and development color signals Y, M, C, K are temporarily stored into a FIFO 22a and a FIFO 22b, depending upon the character data or the picture pattern. These signals are selectively read out by the selector 23. In case of the black character, the data on Y, M and C are reset by the data reset circuit 24, whereas in case of either the color character or the picture pattern, these data are allowed to pass therethrough. A reduction/enlargement circuit 25a is provided to prevent the color editing region from being shifted from the normal copy region even when the reduction and enlargement operations are carried out. The reduction/enlargement information are decoded by an area decoder 26 to be supplied to various processing units. The image data which is reduced or enlarged by the reduction/enlargement circuit 25b, is subjected to Moire'-elimination and edge-emphasizing in a filter 27, and then a color adjustment and a density adjustment with respect to the color characters, black characters and picture patterns are carried out by properly selecting coefficients for the respective color components in a multiplier 28. This image data is either stored into a memory system 200, or outputted as an image at ROS 300.

FIG. 4 is a schematic block diagram showing an overall arrangement to edit/process image data.

An edit processing unit 400 is provided to perform a color edit and a region production, in which the image signals L, a, b from the selector 17 are converted into L, C, H in order that the color edit and color conversion may be readily performed at LUT 415a, and 24-bit image data is converted into 20-bit image data so as to reduce a memory capacity of a color conversion/pallet 413 provided at the post stage thereof. The color conversion/ pallet 413 includes 32 different sorts of color pallets used in the color edit operation. Only the image data of the region to be color-converted are inputted into the color conversion/pallet 413, and the image data of other regions are directly transferred to the selector 416 and then are sent to the above-explained matrix circuit 16b. The L, C, H signals which have been color-converted are again converted into the L, a, b signals to thereby return to the 24-bit data to be applied to the selector 416. Both of marker signals (three colors) and a 4-bit close region signal from the color conversion/pallet 413 are applied to a density converting/region producing circuit 405. At this time, the density conversion from 400 spi to 100 spi is effected by performing such a binary process with employment of the FIFO 410a, 470b and 410c that if the number of black pixels within 16 pixels of a 4×4 window is greater than or equal to a predetermined number, the block pixel signals are set to "1". The density converting/region producing circuit 405 writes the thus produced markers (closed loop and marker dot) into a plane memory 403. Also, as to the marker dot signals, the marker signals are delayed by 9 lines by way of the FIFO 408 in order not to erroneously detect a small dust as the marker, and the marker/dot detection is performed by a 9×9 window, whereby coordinate values of the marker and dot are produced and then stored into a RAM 406. It should be noted that although these marker and dot data are stored also in the plane memory, this process is carried out in order to present such an error detection.

The plane memory 403 acts as a memory for producing a region when the color edit operation is carried out, into which, for instance, the region may be written by an editor pad. That is to say, the coordinate data designated by the editor pad is transferred via a CPU bus to a graphic controller 401, and then the region is written via a DRAM controller 402 into the plane memory 403 in response to an address signal from the graphic controller 401. The plane memory 403 includes four planes, and since the region-reading out operations from the plane memory are simultaneously performed with respect to four planes, respectively, 16 sorts of regions from 0 to 15 may be produced.

When the region data are read from the plane memory 403, in order that the closed loop curve does not become a zigzag line, the region data are delayed by 4 lines in the FIFO 409a and 409b, and are interpolated so that the density conversion from 100 spi to 400 spi is performed under control of the density conversion/region generation circuit 405. The timing adjustment of the color-edited data is carried out by way of delay circuits 411a, 411b and 1 MFIFO so that the timing with the image data read by the image input unit can be adjusted.

Subsequently, a construction of the present invention will now be explained with reference to FIG. 1.

Figure 5A:
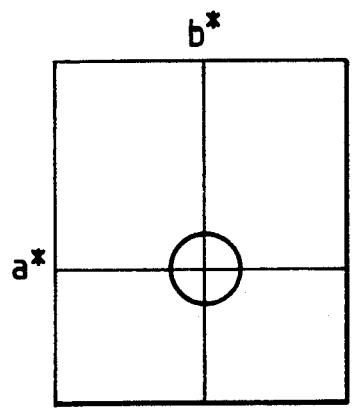
FIGS. 5(a) and 5(b) are explanatory diagrams for the description of a pixel color judging method.
Figure 5B:
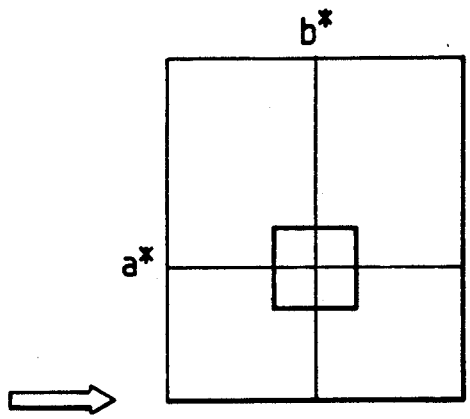

In FIG. 1, an original is read out by image reading means 1, and then R, G and B image data are converted into L, a, b color display coordinate system data represented by luminance and color differences by way of color display coordinate system converting means 2 constructed of a matrix. With the L, a, b display system data (of course, including L*, a* and b* obtained by standardizing L, a, b), it may be judged whether the color is of monochromatic on an a-b plane based upon a distance from an origin. In a conventional apparatus, as shown in FIG. 5(a), such a judgement has been performed that a circle having a predetermined radius is drawn on the a-b plane, and if the pixel is located within this range, the color thereof is of monochromatic, whereas if the pixel is positioned outside this range, it is of chromatic. This judgement whether or not the color is located within this circular region requires a calculation of a square term resulting in various problems. That is, the hardware construction becomes complex and since this judgement is executed with regard to all pixels, extremely long processing time must be required. In view of the above, according to the present invention, a judgement region is set to a tetragonal region as shown in FIG. 5(b). With such a tetragonal region, it is possible to set both of a maximum value and a minimum value with respect to "a" and "b" readily, as a result of which a judgement can be readily done whether or not the pixel is located within this region by using a window comparator. Therefore, the hardware arrangement becomes very simple and the entire processing time can be considerably shortened.

Figure 6A:
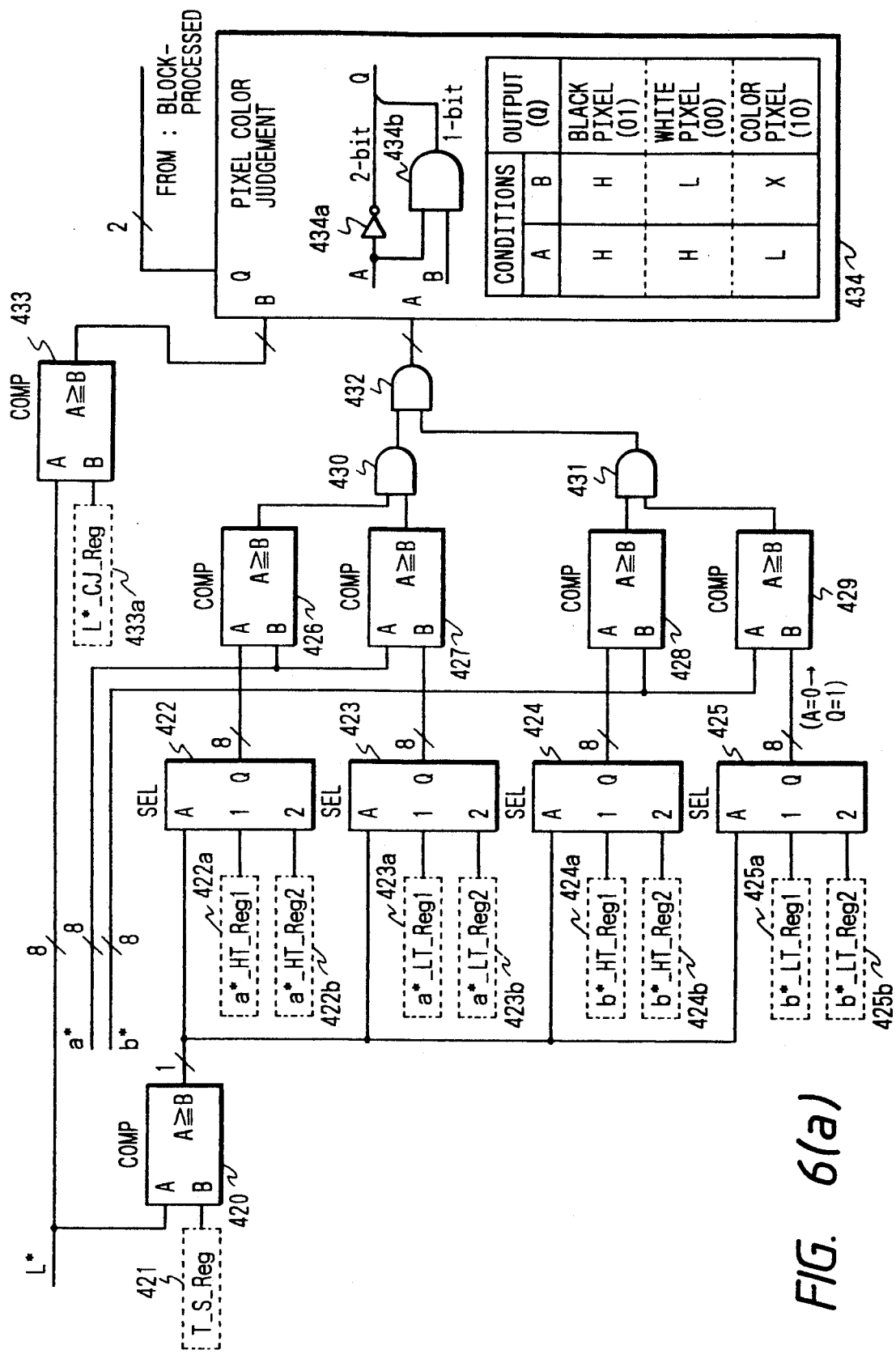
FIG. 6(a) is a circuit diagram showing a judging circuit of a pixel color of the present invention.
Figure 6B:
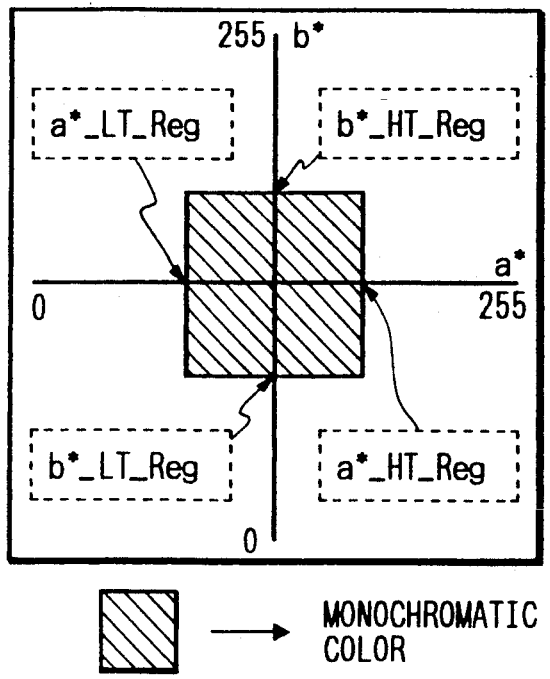
FIG. 6(b) is an explanatory diagram for the circuit of FIG. 6(a)

FIG. 6(a) is a circuit diagram showing an example of such a pixel color judging circuit. This judging circuit operates to produce to an A-input of a pixel color judging circuit 434, an output of "1" when a and b. (corresponding to the standardized "a" and "b") which are detected by four window comparators 426 to 429 and AND gates 430 to 432, are located within the rectangular region as shown in FIG. 6(b), and also an output of "0" when they are positioned outside this rectangular region. On the other hand, after a comparison is made whether or not L* (corresponding to the standardized "L") is greater than a threshold value preset in the register 433a by the comparator 433, the output of "1" is applied to the other input terminal B of the pixel color judging circuit 434. As represented in FIG. 6(a), the pixel color judging circuit 434 outputs (01) representing a black pixel when the inputs "A" and "B" are (H, H), respectively; (00) representing a white pixel when the inputs A and B are (H, L), respectively; and (10) representing a color pixel when the inputs A and B are (L, X), respectively.

Applied from registers 422a to 425b through selectors 422 to 425 to comparison inputs of the window comparators 426 to 429 are either threshold values set in the registers 422a, 423a, 424a and 425a or those set in the registers 422b, 423b. 424b and 425b. The L* is compared with a threshold value set in a register 421 in a comparator 420. As a result, when the L* is of low, that is, when the L* is of 0, each of the selector 422 to 425 produces an output of "1" so that the registers 422a, 423a, 424a and 425a are selected to apply the threshold values set therein through input terminals 1 of the selectors 422 to 425 to the comparators 426 to 429, respectively. On the other hand, when the L* is of higher than the threshold value, Q becomes equal to "2" so that the registors 422b to 425b connected to terminals 2 of the selectors 422 to 425 are selected to allow the threshold value set therein to be applied through the selectors 422 to 425 to the comparators 426 to 429, respectively. To this end, the dimension of the rectangular region as shown in FIG. 6(b) is set to small under low luminance whereas the dimension thereof is set to large under high luminance. As a result, the correct color detection can be achieved by changing the color pixel detecting precision, depending upon the bright case and the dark case.

Figure 7:
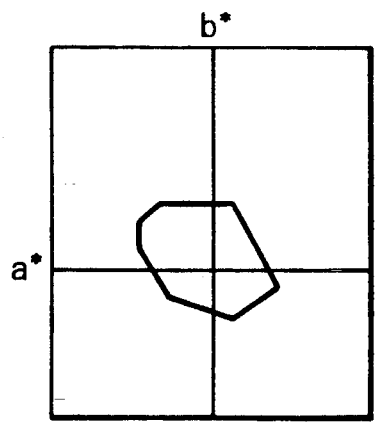
FIG. 7 is an explanatory diagram for the description of another pixel color judging method.

The shape of the region is not necessarily set to a tetragon, but may be set to a polygonal region as shown in FIG. 7, resulting in a large degree of freedom as to the pixel color judgement. Furthermore, this changes in the size of the region in accordance with a degree of luminance may be applied to such a case that the shape of the region is set to a circle on the a-b plane as in the conventional one.

Figure 8:
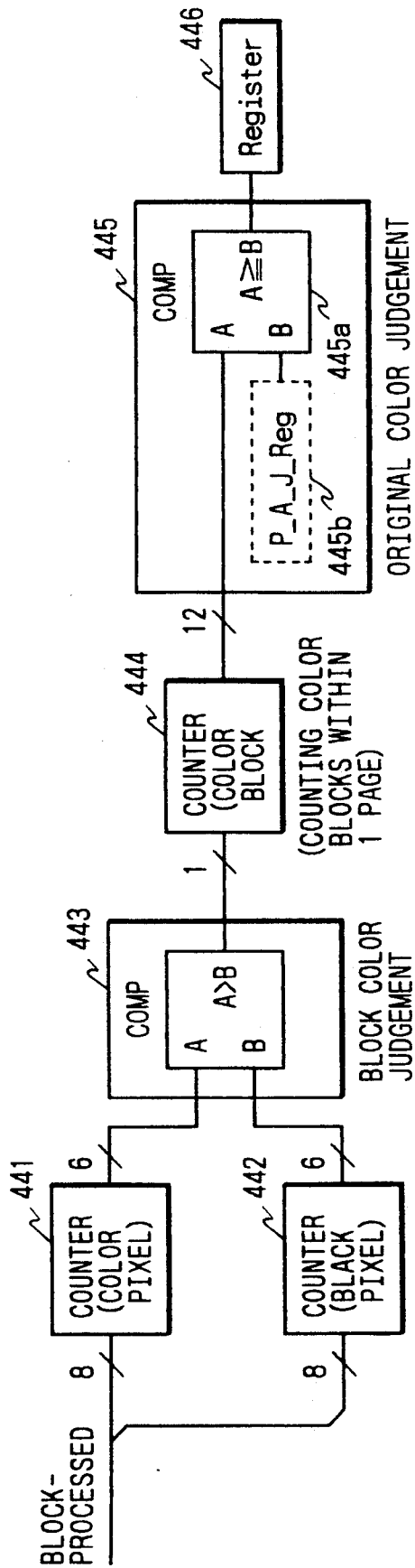
FIG. 8 is a block diagram showing a judging circuit for original color judgement.

After the colors of all pixels are judged in the above-described manner, a color judgement for blocks each including a plurality of pixels, 4×8 pixels for instance, is then carried out by a block color judgement means 4 shown in FIG. 1. An example of the block color judgement means 4 is as shown in FIG. 8.

The output from the pixel color judging circuit 434 of FIG. 6(a) is counted by a color pixel counter 441 and a black pixel counter 442, respectively. The color pixel counter 441 counts the number of data (10) among data inputted thereto as the color pixel, and the black pixel counter 442 counts the number of data (01) among them as the black pixel. It should be noted that no count operation is carried out with respect to a white pixel.

Next, a block color judging circuit 443 compares the count value of the color pixel and the count value of the black pixel each other. When the count value of the color pixel is larger than that of the black pixel, the block to be detected is recognized as a color block and then this count value is counted by a counter 444. On the other hand, if the count value of the black pixel is larger than that of the color pixel, the block is recognized as a monochromatic block and thus no counting operation is executed by the counter 444.

As described above, the number of color blocks over the entire original is counted. In the original color judging circuit 445 shown in FIG. 8 corresponding to the original color judging means 5 shown in FIG. 1, the count value of the color block is compared with the threshold value set in the register 445b in the comparator 445a, so that when the number of color blocks exceeds the threshold value, a judgement is made that the original is of "color", and then the judgement is registered in the register 446. On the other hand, if the number of color blocks is smaller than the threshold value, it is judged that the original color is of monochromatic, and then the register 446 is set to "0".

Figure 9:
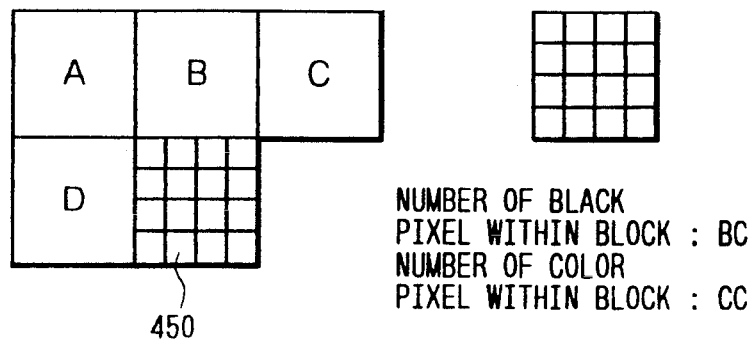
FIG. 9 is an explanatory diagram for the description of a method for referring to judgement results of neighbor blocks.

It should be noted that although the block color may be judged if the number of color pixels is clearly different from that of black pixels by a judgement result of the block color judging circuit 443, the block color may not be correctly judged by way of a decision of majority when the difference between these numbers is small. Accordingly, an acceptable judgement result may be obtained in such a case, if the following block color judgement is performed referring to types of four blocks A, B, C and D adjacent to an aimed block 450 as shown in FIG. 9. Assuming that the number of color blocks within these four adjacent blocks is "N" and the number of monochromatic blocks within the four adjacent blocks is "M", the number of color pixels within the block 450 is "CC" and the number of black pixels within the block 450 is "BC", a comparison is done between $\{CC \times (N/4)\}$ and $\{BC \times (M/4)\}$, and the weighing operation is performed based on the judging results of the adjacent blocks to accomplish the judgement of block color.

Figure 10:
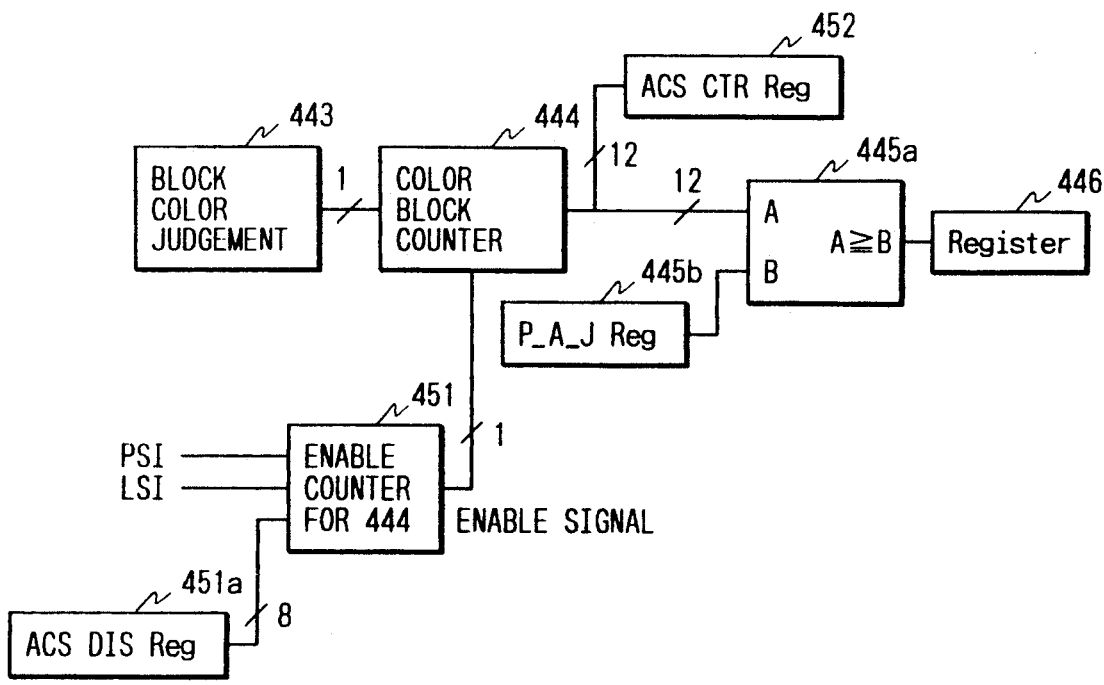
FIG. 10 is a block diagram showing one example of original color judgement.

Normally, the judgement of the original color is carried out during the back scanning operation of either the prescanning operation or the data acquisition in order to accelerate the copy speed. However, when the sensor for acquiring the data is returned, there may occur some problems that the sensor unit causes vibrations, as a result of which the monochromatic original is erroneously recognized as the color original. Thus, after the judgement is made whether the acquired image data is of monochromatic or color every block, when the number of blocks which have been judged as color, is counted by the counter, the error recognition caused by the vibrating region can be prevented by stopping the operations of the counter. More concretely, as shown in FIG. 10, an enable counter 451 for a color block counter is employed to control a counting operation of a color block counter 444 and a predetermined value is set into a register 451a in advance, so that it is not until the counter counting the predetermined value from the start of the prescanning that the enable counter 451 produces an enable signal to the color block counter 444. The enable signal is outputted to cause the counter to count the signals after the vibrations of the sensor can be made stable.

In this case, the predetermined values to be set to the register 451a is variable, and therefore may be properly changed, if necessary. The value of the color block counter 444 is stored into the register 452 so as to be displayed visually. As to a large original such as A3-sized original and a small original such as a post card, even if the numbers of color blocks thereof are equal to each other, a ratio of the color region to one original is different from that of the other original. As a result, in case of the small sized original, there are possibilities that the original color is judged as the monochromatic color even if the ratio of the color region to the entire region is large. Also, since the function debugging of color discrimination and the parameter designing become complex with only the judgement result data, such complex debugging and parameter designing may be mitigated by referring to the count value of the color block counter. Further, the proper threshold values may be set with respect to any sorts of originals smaller than a A3-sized original, and therefore precise color discrimination can be done.

Figure 11A:
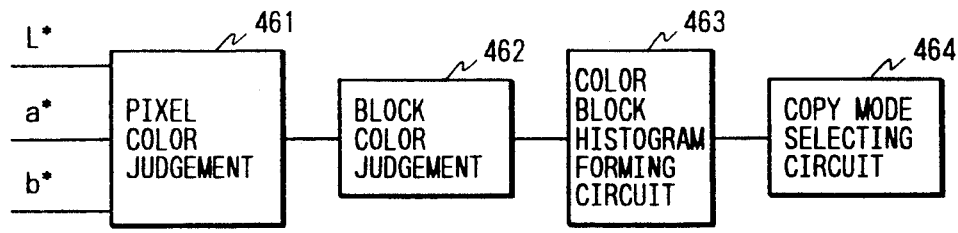
FIGS. 11(a) and 11(b) are explanatory diagrams for the description of an original color judging method using a color histogram.
Figure 11B:
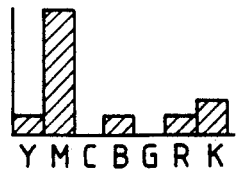

In the case where a monochromatic color original which is not needed to be copied in a full color mode, is copied in the full color mode, undesired running cost is required, and further that it is inconvenient to carry out such a mode setting operation manually. Therefore, as shown in FIG. 11(a), after the pixel color is judged by a pixel color judging circuit 461 and the block color is then judged by a block color judging circuit 462, histograms for the respective colors such as Y, M, C, B, G, R and K are formed as shown in FIG. 11(b) in a color block histogram forming circuit 463. Then, a difference between the number of color blocks with the maximum occurrence frequency, i.e., M shown in FIG. 11(b), and the number of color blocks with the second occurrence frequency, namely K shown in this figure is calculated. The mode may be automatically set under condition that if this difference is greater than a predetermined value, it is set as a monochromatic color copy mode by the color block color with the maximum frequency. As a result, the mode designation is carried out in a copy mode selecting circuit 464 in response to the output result from the color block histogram forming circuit 463.

It should be noted that when a selection is made from either the 4-color mode or the single color (single K color) mode by comparing with the threshold value according to the block count method, there are possibilities that an erroneous judgement happens to occur particularly in case of an original having a small area. Thus, the judgement results in unit of block are not limited merely to "0" and "1", but may be multi values such as "0", "1", "2", ---, and the judgement results with high chroma are weighted, so that even if a colored area within an original is narrow, the count values are increased by way of the weighing process, so that a sufficient detection may be achieved without setting of the small threshold value.

Figure 12A:
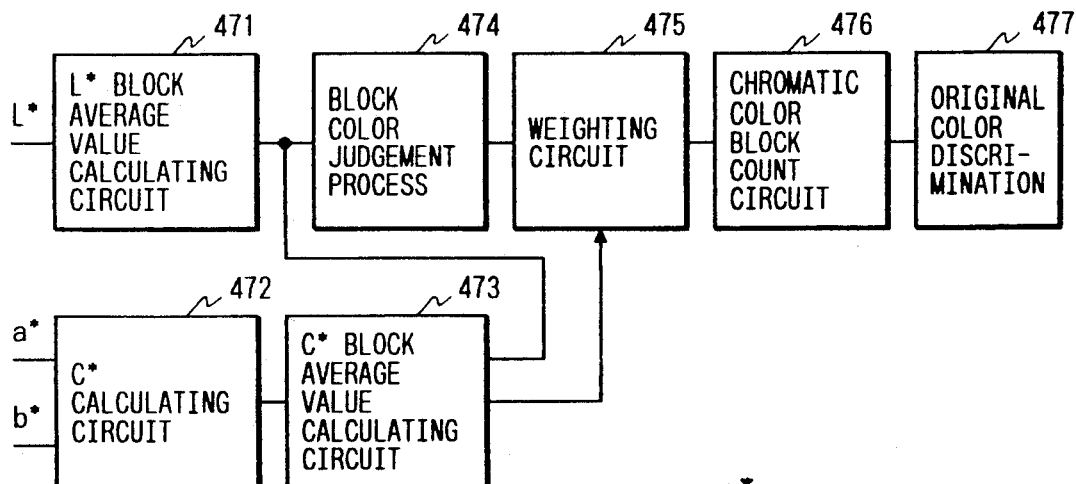
FIGS. 12(a) and 12(b) are explanatory diagrams for the description of an original color judging method for weighing chroma.
Figure 12B:
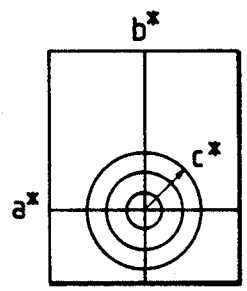

FIG. 12(a) is a block diagram showing a circuit arrangement for performing the above weighing process. As shown in FIG. 12(b), chroma C* is obtained in a calculation circuit 472 on a a*-b* plane, and also an average value of chroma C* is obtained in an average value calculation circuit 473. On the other hand, an average value of L* is obtained in a calculation circuit 471, and the block color judgement is carried out in the block color judgement/process circuit 474 from these values. Furthermore, the chromatic blocks are ranked as for example 1, 2 and 3 by the block color judgement process in such a manner that a chromatic color block 3 is multiplied three times by the weighing circuit 475, a chromatic color block 2 is multiplied twice, and a chromatic color block 1 is multiplied once, whereby these weighted blocks are counted by a chromatic color block counting circuit 476. As a result of this counting operation, the discrimination is performed by the original color discriminating circuit 477, so that even when a colored area is small, the possibilities of occurrences of erroneous judgments may be lowered and the detection precision may be improved without setting of small threshold values.

It may cause an economical problem in production cost that 4 color mode judgement is carried out even when a color in an original is of a primary color of C, M, Y, or a secondary color of R, G, B, and thus it is desired that the judgement results of the original colors can be obtained by not the four color mode or the monochromatic color mode, but either one of four colors, three colors, two colors, or single color. As a consequence, if a judgement is made whether the color mode corresponds to a single color mode, two-color mode, or three color mode by observing values of color detecting outputs for such a portion which has been judged as a color based upon the read data during the scanning operation and also a balance thereof, it is very useful since the colors of the business documents may be either the primary colors or the secondary colors.

Figure 13A:
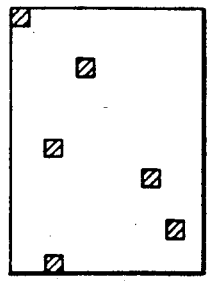
FIGS. 13(a) to 13(d) are explanatory diagrams for the description of an original color judging method utilizing a medium block.
Figure 13B:
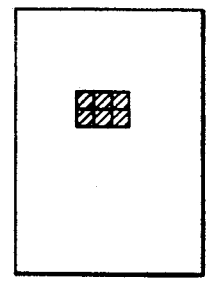
Figure 13C:
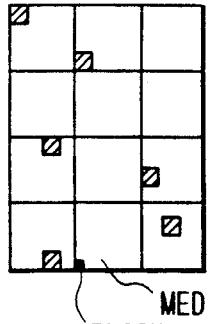
Figure 13D:
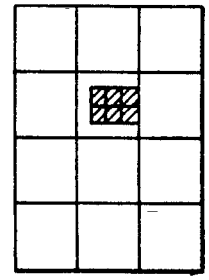

There may also occur a problem that no judgement is made with regard to a small logo or the like being of color, if the block counting method is simply applied. In case of the color block caused by color shifts as shown in FIG. 13(a), it may not be judged as being of color as is similar to such a small colored portion as shown in FIG. 13(b), as a result of which the same erroneous judgement may be effected. Accordingly, as shown in FIGS. 13(c) and 13(d), the judgement should be carried out with regard to medium size blocks each including 16×16 blocks. In this case, if at least one of medium size blocks is judged as being of color, the original is regarded as being of color. Furthermore, even when another judgement result is made that the color of all medium blocks are of monochromatic, if it is decided according to the block counting method in view of blocks each including 4×8 pixels as described above, that the original is of color, the original is regarded finally as being of color. Only in the case where the other judgement is made that the color of all medium blocks are of monochromatic and it is judged according to the block counting method that the original is of monochromatic, it is decided as a "single color mode", whereby such a color shift condition as shown in FIG. 13(c) is decided as a "monochromatic color", and such a small colored portion as shown in FIG. 13(d) is decided as a "color" so as to prevent that the detection precision is lowered due to a small discriminating region.

Figure 14:
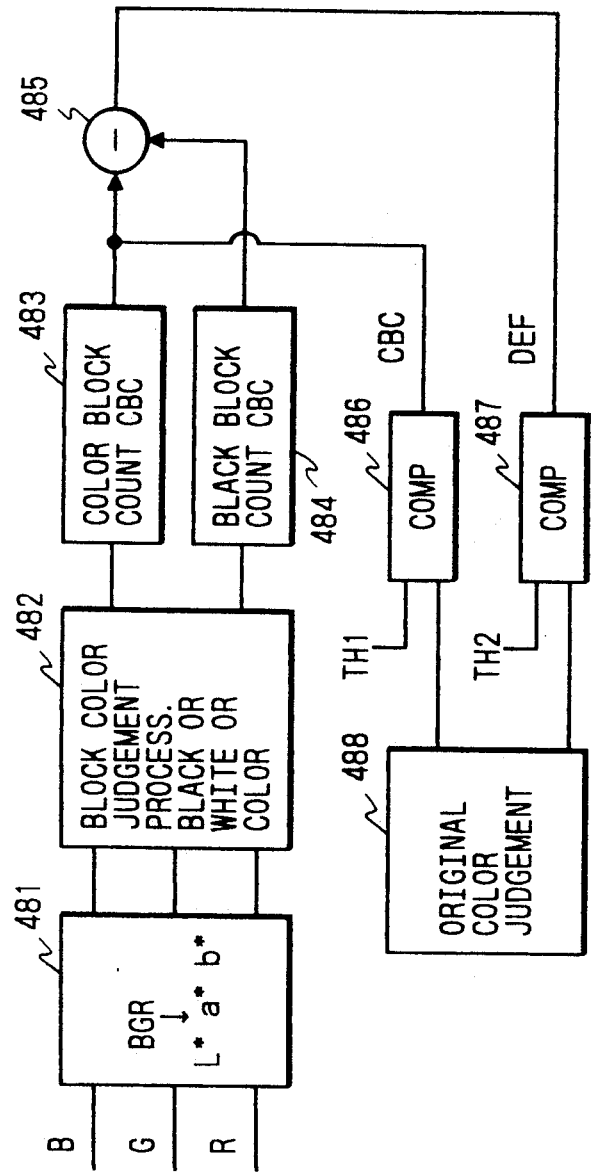
FIG. 14 is an explanatory diagram for the description of an original color judging method using the number of color blocks and a difference between color blocks and black blocks.

FIG. 14 shows another preferred embodiment of the present invention. In FIG. 14, color blocks are counted by a color block counter 483 based upon judgement results issued by a block color judgement process circuit 482, black blocks are counted by a black block counter 484, and a difference between these counted values is calculated by a subtractor 485. Only when a comparison is made by a comparator 486 such that the number of color blocks is larger than a predetermined value, and furthermore a difference between the number of color blocks and the number of black blocks is not less than a preselected value, it is judged as a "color" by an original color judging circuit 488. With such a process, even if, for example, a monochromatic original is detected as a "color original" due to the color shifts of the image sensor, since these colors are canceled by calculating the difference between the number of color blocks and the number of black blocks, correct judgments can be accomplished regardless of the color shifts contained in the original.

Figures 15, 16:
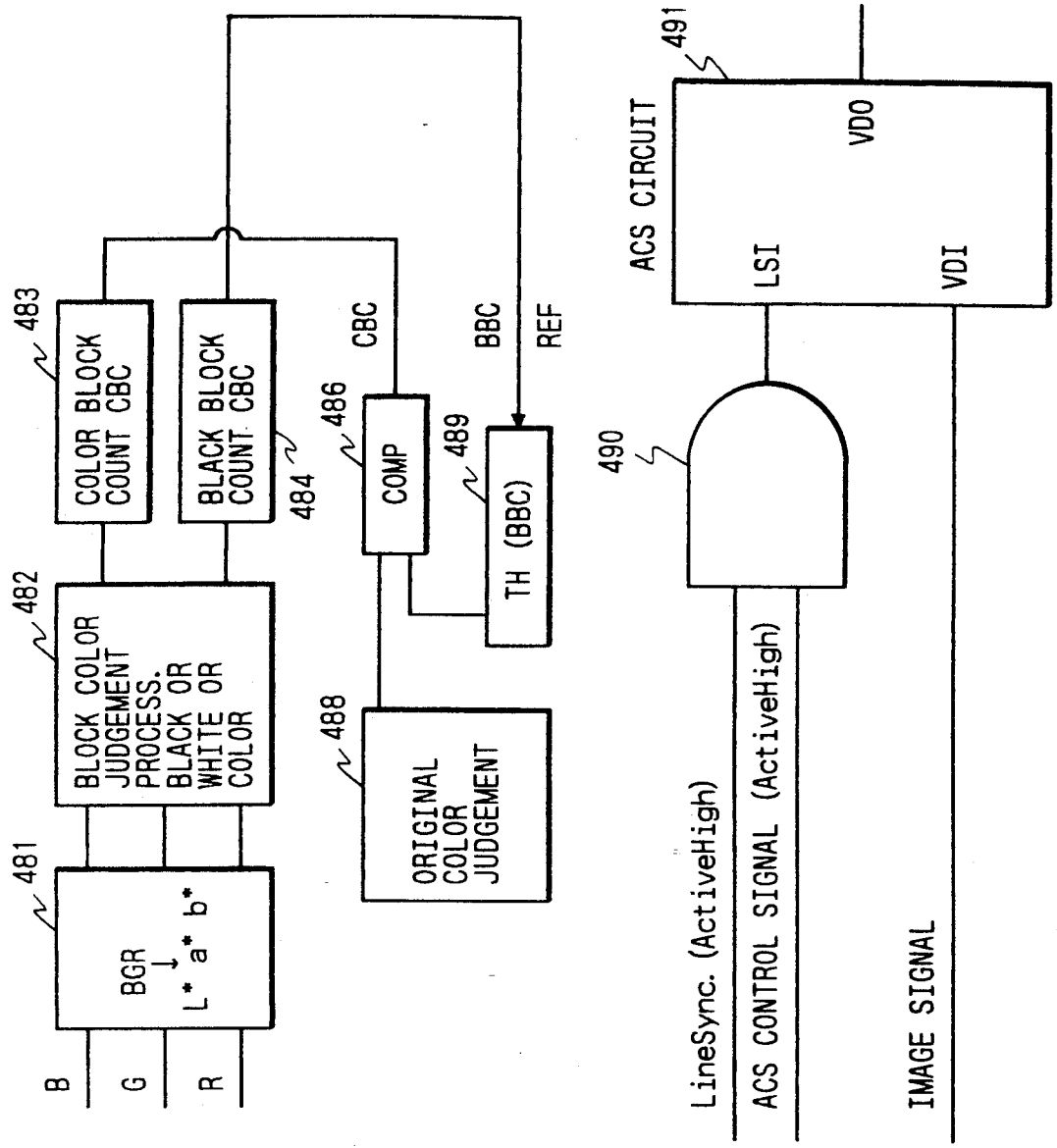
FIG. 15 is an explanatory diagram for the description of an original color judging method in which a threshold value to judge a color original is changed based on the number of black blocks detected.
FIG. 16 is an explanatory diagram for the description of an original color judging method by designating a region.

FIG. 15 is a block diagram showing such a circuit that a threshold value for color original judgement is changed according to the number of black blocks, in which a preset value of a register 489 is varied based upon an output value of a counter 484, and more specifically the larger the number of black blocks becomes, the higher the threshold value becomes.

In the case where the original color judgement is effected entirely with regard to the scanning area, if a trimming instruction is made so that the trimming region is made monochromatic whereas the remaining regions are made chromatic, it is judged that the original is of color. However, since no color edit is required for the regions other than the trimming area, there is another problem. Therefore, it is necessary to designate areas to which the original color judgement is to be performed or not. Accordingly, if the above-described trimming instruction is issued, no original color judgement is carried out as to other regions thereby resulting in eliminating the above described problem.

To this end, as shown in FIG. 16, an ACS (original color judgement) control signal is inputted to an AND circuit 490 to designate the region to be subjected to the original color judgement, at the same time when a line synchronization signal is applied thereto. As a result, the image signal which is to be acquired, is restricted by the designation of the are, and the original color judgement is performed in an ACS circuit 491 in accordance with this restricted data. Also, when the color judgement is performed by counting the color blocks, such a color judgement is not carried out over the entire original, but if there are color blocks the number of which is larger than a certain constant value, it may be judged as a "color original". In other words, all of the scanning sizes of the original are not required to be counted, but such a counting operation is sufficient that the count value becomes a threshold value by which it can be judged as a "color original". As a consequence, the color block counter for judging the original color may be constructed of counters having a minimum bit number, and when the content of this counter becomes full, this counter is brought into a disable state so that the counting operation is interrupted. If the counter value is overflown, the counter value is held at its maximum count value.

As is apparent from the above, according to the present invention, the color pixels and black pixels of the original can be judged by a simple hardware arrangement with high accuracy, and the process time which is required to accomplish the judgement can be shortened remarkably. Further since the judging reference for judging whether the original is of monochromatic color or chromatic color can be changed depending upon density, more correct color judgement can be realized.

What is claimed is:

1. A color image recognition apparatus having an image reading means for reading an image data of an original to detect a color of said original, comprising:

color display coordinate system converting means for converting the image to L, a, b image data including luminance data and color difference data;

pixel color judging means for judging a pixel color of each pixel based upon the luminance data and the color difference data;

means for counting a number of color pixels and a number of black pixels contained in each of a plurality of pixel blocks in the original;

block color judging means for comparing the number of color pixels with the number of black pixels contained in each block to judge the color of each block; and original color judging means for counting the number of color blocks over the original to judge the color of the original.

2. The color image recognition apparatus as claimed in claim 1 wherein said pixel color judging means sets a region on the plane of color difference "a-b", and wherein said pixel color judging means detects whether or not the color difference of the image data is located within the region to judge the color of a pixel.

3. The color image recognition apparatus as claimed in claim 2 wherein said pixel color judging means sets a tetragonal region.

4. The color image recognition apparatus as claimed in claim 2 wherein said pixel color judging means sets a polygonal region.

5. The color image recognition apparatus as claimed in claim 2 wherein said pixel color judging means changes a size of said region in response to the luminance data "L".

6. The color image recognition apparatus as claimed in claim 1 wherein said block color judging means judges the color according to a decision by majority when a difference between the number of color pixels and the number of black pixels contained in the each block is not less than a predetermined value, and wherein said block color judging means judges the color with reference to block color judgement results of neighbor blocks when the difference between the number of color pixels and the number of black pixels is less than the predetermined value.

7. The color image recognition apparatus as claimed in claim 1 wherein said original color judging means judges the color of the original based on the number of color blocks which occur after a predetermined number of lines has passed from the start of a prescanning operation.

8. The color image recognition apparatus as claimed in claim 1 wherein said original color judging means stores a count value of a color block counter into a memory means.

9. The color image recognition apparatus as claimed in claim 1 wherein said original color judging means comprises histogram forming means for forming a color block histogram according to the block color judgement result, and wherein said original color judging means selects an image processing mode according to a difference between the number of color blocks with maximum occurrence frequency and the number of color blocks with second occurrence frequency.

10. The color image recognition apparatus as claimed in claim 1 wherein said original color judging means comprises a chromatic block counting circuit for counting a chromatic block with weighing the color block in accordance with chroma.

11. The color image recognition apparatus as claimed in claim 1 wherein said original color judging means recognizes a color image in the form of a monocolor, two colors, three colors, or four colors.

12. The color image recognition apparatus as claimed in claim 1 wherein said original color judging means judges the color of the original according to the color judgement result with regard to medium blocks each including a plurality of blocks, and wherein said original color judging means judges that the original is of color when at least one of said medium blocks is regarded as being of color.

13. The color image recognition apparatus as claimed in claim 1 wherein said original color judging means judges the color of the original according to both a difference between the number of color blocks and the number of black blocks.

14. The color image recognition apparatus as claimed in claim 1 wherein said original color judging means judges the number of color blocks with reference to a predetermined value which is variable in accordance with the number of black blocks.

15. The color image recognition apparatus as claimed in claim 1 wherein said original color judging means judges, the color of the original according to the judgement of color with regard to a limited region defined by a region designating signal.

16. The color image recognition apparatus as claimed in claim 1 wherein said original color judging means counts the number of color blocks as to a plane of the original until the number of color blocks reaches a predetermined value.

* * * * *

UNITED STATES PATENT AND TRADEMARK OFFICE
CERTIFICATE OF CORRECTION

PATENT NO. : 5,287,204
DATED : February 15, 1994
INVENTOR(S) : Hiroshi Koizumi et al.

It is certified that error appears in the above-indentified patent and that said Letters Patent is hereby corrected as shown below:

Claim 6, column 13, line 42, delete "the" (second occurrence).

Claim 15, column 14, line 45, after "judges" delete --,--.

Signed and Sealed this

Fifteenth Day of November, 1994

Attest:

BRUCE LEHMAN

Attesting Officer    Commissioner of Patents and Trademarks